United States Patent
Doi et al.

[11] 4,195,912
[45] Apr. 1, 1980

[54] ZOOM LENS SYSTEM

[75] Inventors: Yoshikazu Doi; Yutaka Sakai; Kazunori Ohono, all of Omiya, Japan

[73] Assignee: Fuji Photo Optical Co., Ltd., Omiya, Japan

[21] Appl. No.: 850,453

[22] Filed: Nov. 10, 1977

[30] Foreign Application Priority Data

Nov. 11, 1976 [JP] Japan .................. 51-135546

[51] Int. Cl.² .............................................. G02B 15/16
[52] U.S. Cl. .................................................. 350/184
[58] Field of Search ............................. 350/184, 186

[56] References Cited

U.S. PATENT DOCUMENTS

| | | | |
|---|---|---|---|
| 3,848,969 | 11/1974 | Tajima | 350/184 |
| 4,074,931 | 2/1978 | Okudaira | 350/184 |

FOREIGN PATENT DOCUMENTS 2557547  7/1976  Fed. Rep. of Germany ........... 350/184

*Primary Examiner*—Conrad J. Clark

[57] ABSTRACT

A zoom lens system consists of a front lens group A comprising a negative meniscus lens L1 convex to front (i.e. object side) and a positive lens L3 having the face of greater curvature faced to front, and a rear lens group B comprising a positive lens L4 having the face of greater curvature faced to front, a positive menisucs lens L5 convex to front, a negative lens L6 having the face of greater curvature faced to rear and a positive lens L7. The front and rear lens groups A and B are moved in the opposite directions along the optical axis thereof to vary the focal length thereof. The above zoom lens system satisfies the following conditions where the focal length of the front lens group A is fA, the radius of curvature of the concave face of the negative meniscus lens L1 is r2, the radius of curvature of the front face of the positive lens L3 is r5, the radius of curvature of the convex face of the positive meniscus lens L5 is r9, the radius of curvature of the rear face of the negative lens L6 is r12 and the Abbe dispersion number of the positive lens L3 is ν3; $-2.3 < fA < -1.5$, $0.45 < r2 < 0.65$, $0.5 < r5 < 1.0$, $0.4 < r9 < 0.6$, $0.3 < r12 < 0.55$, $\nu 3 < 40$.

7 Claims, 15 Drawing Figures

ZOOM LENS SYSTEM

BACKGROUND OF THE INVENTION

1. Field of the Invention

This invention relates to a zoom lens system, and more particularly to a zoom lens system for a still camera which has a zooming ratio of 1.67 to 1.85 and an angle of view of about 53° in its wide angle side.

2. Description of the Prior Art

Since it is generally demanded in the zoom lens for still cameras that the size of the lens should be as small as possible with respect to the size of the image focused on the film, the aberration is required to be very severely corrected in comparison with the cameras for motion picture or television. Therefore, no zoom lens of compact size and high performance adapted to be used in still cameras is not put into practical use yet.

SUMMARY OF THE INVENTION

It is therefore the object of the present invention to provide a zoom lens of compact size and high performance which can be used in still cameras.

The zoom lens system in accordance with the present invention comprises a front lens group A comprising a negative meniscus lens L1 convex to front (i.e. object side) and a positive lens L3 having the face of greater curvature faced to front, and a rear lens group B comprising a positive lens L4 having the face of greater curvature faced to front, a positive meniscus lens L5 convex to front, a negative lens L6 having the face of greater curvature faced to rear and a positive lens L7. The front and rear lens groups A and B are moved in the opposite directions along the optical axis thereof to vary the focal length thereof. The above zoom lens system satisfies the following conditions where the focal length of the front lens group A is fA, the radius of curvature of the concave face of the negative meniscus lens L1 is r2, the radius of curvature of the front face of the positive lens L3 is r5, the radius of curvature of the convex face of the positive meniscus lens L5 is r9, the radius of curvature of the rear face of the negative lens L6 is r12 and the Abbe dispersion number of the positive lens L3 is $\nu 3$:

(1) $-2.3 < fA < -1.5$
(2) $0.45 < r2 < 0.65$
(3) $0.5 < r5 < 1.0$
(4) $0.4 < r9 < 0.6$
(5) $0.3 < r12 < 0.55$
(6) $\nu 3 < 40$

The meaning of the above conditions will hereinbelow be described in detail.

Condition (1): This condition is for making the length of the lens system at the long focal length side as small as possible and making the back focal length of the lens system at the wide angle side as long as possible. For this purpose, the absolute value of the focal length fA of the front lens group A is desired to be as small as possible. However, if it is too small, the aberration is markedly increased.

Condition (2): This condition is for correcting coma and astigmatism in the wide angle side. The surface r2 has an effect on the two aberrations. If r2 exceeds the upper limit, the astigmatism is not corrected sufficiently. If it falls below the lower limit, the coma increases and in addition spherical aberration is too much corrected in the long focal length side.

Condition (3): This condition is for correcting spherical aberration in the long focal length side. The diverging effect by the concave face of the negative meniscus lens L1 over-corrects the spherical aberration. Therefore, the front face r5 of the positive lens L3 should be made insufficient in correcting spherical aberration. If r5 exceeds the upper limit, the over-correction of the spherical aberration is not prevented. If it falls below the lower limit, the spherical aberration is not sufficiently corrected.

Condition (4): This condition is for correcting spherical aberration. The face r9 greatly influences on the spherical aberration since the rays passing through the lens system are most remoted from the optical axis when they pass through the face r9. If r9 exceeds the upper limit, the spherical aberration is over-corrected and if it falls below the lower limit the correction of the spherical aberration is insufficient.

Condition (5): This condition is for correcting astigmatism and coma. The face r12 diverges light rays passing therethrough to correct astigmatism and coma. If r12 exceeds the upper limit, the correction becomes insufficient and if it falls below the lower limit these aberrations are over-corrected.

Condition (6): This condition is for correcting the chromatic aberration. In a zoom lens system, each lens group must independently be achromatic. In the lens system of this invention, the front lens group A has a negative power. Therefore, in order to make the front lens group A achromatic, the Abbe dispersion number $\nu 3$ of the positive lens L3 should be made small.

DESCRIPTION OF THE PREFERRED EMBODIMENTS

Figure 1:
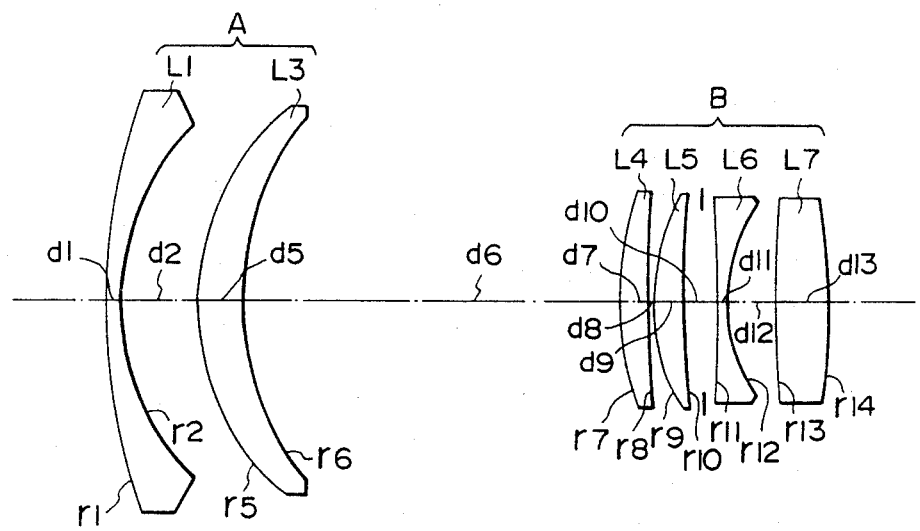
FIG. 1 is a longitudinal illustration of the zoom lens system in accordance with an embodiment of the present invention.
Figures 2, 3:
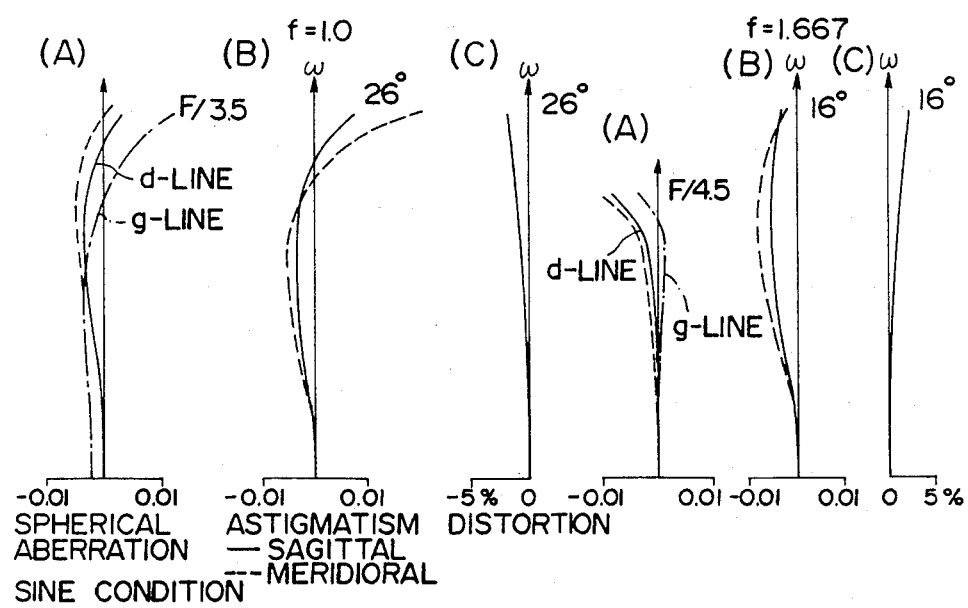
FIGS. 2A, 2B and 2C are graphs representing the correction for spherical aberrations and the deviation in the sine condition, the correction for astigmatism and the correction for distortion, respectively, of the lens system shown in FIG. 1 wherein the focal length of the lens system is set to be 1.0.
FIGS. 3A, 3B and 3C are graphs similar to FIGS. 2A, 2B and 2C, respectively, wherein the focal length of the lens system is changed.

Preferred embodiments of this invention will hereinbelow be described in detail. In the description hereinbelow and in the drawings, the radii of curvature of the refracting surfaces, the axis air separations or thicknesses of lenses, the refractive indices for the sodium d-line and the Abbe dispersion numbers are respectively designated at r, d, N and $\nu$ which are numbered respectively by subscripts in order from front to rear. Only in the first embodiment shown in FIG. 1, a second lens which should be designated at L2 is omitted, and accordingly, the second lens from front illustrated is designated at L3 and the front face of the second lens L3 is designated at r5. The thickness of the lens L3 is designated at d5 and so on.

The structure of the first embodiment is the same as that of the zoom lens system described in the section of Summary of Invention. The second to fifth embodiments are different from the first in that the front lens group A includes a negative lens L2 between the negative meniscus lens L1 and the positive lens L3. In these embodiments, the surfaces and the air separations or thicknesses of lenses are consecutively numbered.

In the embodiments described hereinbelow, the focal length (f), back focal length (l), F-number (FN) and angle of view (2W) of the lens system at its wide angle side (W) and the longest focal length side (T) are respectively designated at $f'_W$, $f'_T$, $l'_W$, $l'_T$, $FN_W$, $FN_T$, 2W(W) and 2W(T).

A first embodiment of this invention is shown in FIG. 1 and the correction of aberrations thereof is shown in FIGS. 2A to 2C and 3A to 3C. The specific dimensions and characteristics thereof are shown in Table I.

TABLE I

| | | | |
|---|---|---|---|
| r1 = 1.23815 | | | |
| | d1 = 0.036 | N1 = 1.744 | ν1 = 44.9 |
| r2 = 0.52874 | | | |
| | d2 = 0.1711 | | |
| r5 = 0.53579 | | | |
| | d5 = 0.099 | N3 = 1.80518 | ν3 = 25.5 |
| r6 = 0.62689 | | | |
| | d6 = 0.8367 ~ 0.0225 | | |
| r7 = 0.59616 | | | |
| | d7 = 0.0675 | N4 = 1.6968 | ν4 = 55.6 |
| r8 = 3.76112 | | | |
| | d8 = 0.0045 | | |
| r9 = 0.4317 | | | |
| | d9 = 0.063 | N5 = 1.6779 | ν5 = 55.5 |
| r10 = 1.6554 | | | |
| | d10 = 0.0779 | | |
| r11 = −28.69185 | | | |
| | d11 = 0.027 | N6 = 1.80518 | ν6 = 25.5 |
| r12 = 0.33789 | | | |
| | d12 = 0.1080 | | |
| r13 = 2.99972 | | | |
| | d13 = 0.1162 | N7 = 1.76182 | ν7 = 26.5 |
| r14 = −1.2919 | | | |
| f'W = 1.0 | f'T = 1.667 | l'W = 1.0103 | l'T = 1.3233 |
| FNW = 3.5 | FNT = 4.5 | 2W(W) = 52° | 2W(T) = 32° |

Figure 4:
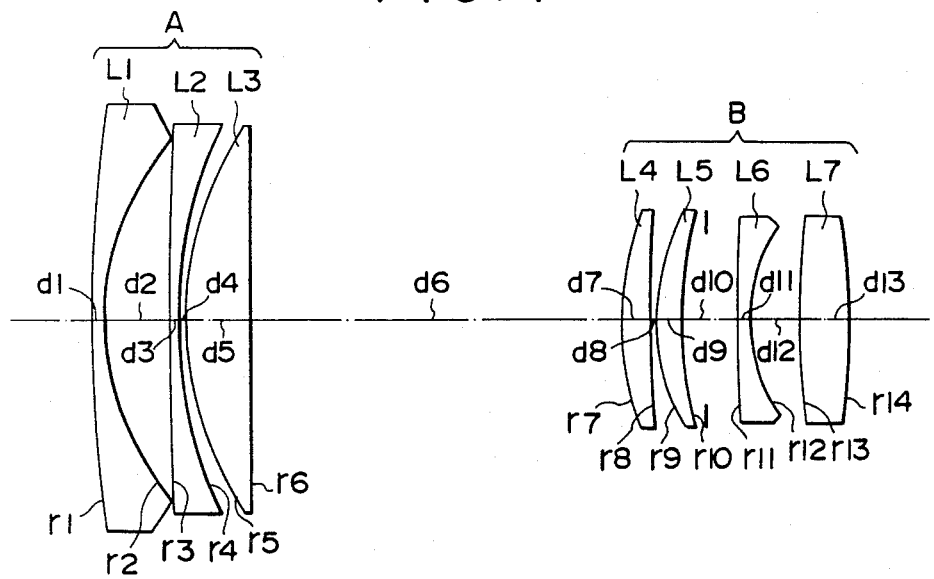
FIGS. 4, 7, 10 and 13 are longitudinal illustrations of the zoom lens system in accordance with other embodiments of the present invention.
Figure 5:
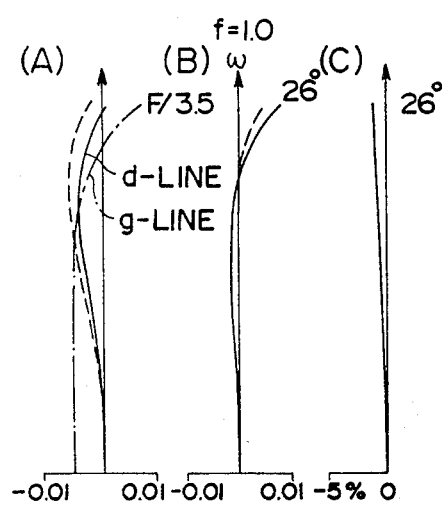
FIGS. 5A-5C, 8A-8C, 11A-11C and 14A-14C are graphs similar to FIGS. 2A-2C showing the correction of aberrations of the lens systems shown in FIGS. 4, 7, 10 and 13, respectively.
Figure 6:
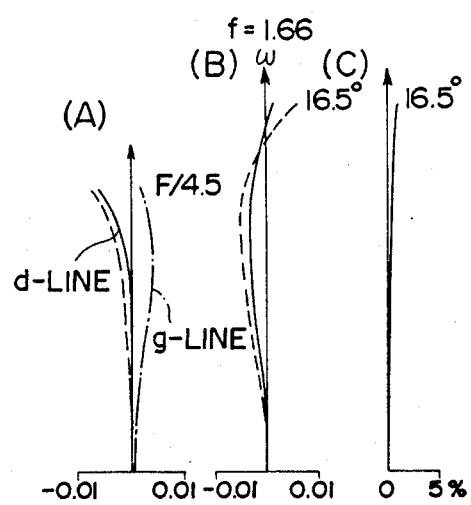
FIGS. 6A-6C, 9A-9C, 12A-12C and 15A-15C are graphs similar to FIGS. 3A-3C showing the correction of aberrations of the lens system shown in FIGS. 4, 7, 10 and 13, respectively.

A second embodiment of this invention is shown in FIG. 4 and the correction of aberrations thereof is shown in FIGS. 5A to 5C and 6A to 6C. The specific dimensions and characteristics thereof are shown in Table II.

TABLE II

| | | | |
|---|---|---|---|
| r1 = 2.8088 | | | |
| | d1 = 0.0365 | N1 = 1.68893 | ν1 = 31.1 |
| r2 = 0.58955 | | | |
| | d2 = 0.1415 | | |
| r3 = 12.6753 | | | |
| | d3 = 0.0274 | N2 = 1.62299 | ν2 = 58.1 |

TABLE II-continued

| | | | |
|---|---|---|---|
| r4 = 1.00509 | | | |
| | d4 = 0.0046 | | |
| r5 = 0.73126 | | | |
| | d5 = 0.146 | N3 = 1.68893 | ν3 = 31.1 |
| r6 = 76.0507 | | | |
| | d6 = 0.92311 ~ 0.02373 | | |
| r7 = 0.64269 | | | |
| | d7 = 0.0685 | N4 = 1.6968 | ν4 = 55.6 |
| r8 = 5.24504 | | | |
| | d8 = 0.0046 | | |
| r9 = 0.47139 | | | |
| | d9 = 0.0639 | N5 = 1.6779 | ν5 = 55.5 |
| r10 = 0.98131 | | | |
| | d10 = 0.1264 | | |
| r11 = 11.4077 | | | |
| | d11 = 0.0274 | N6 = 1.80518 | ν6 = 25.5 |
| r12 = 0.36622 | | | |
| | d12 = 0.1052 | | |
| r13 = 1.43044 | | | |
| | d13 = 0.12 | N7 = 1.6668 | ν7 = 33.1 |
| r14 = −1.43044 | | | |
| f'W = 1.0 | f'T = 1.663 | l'W = 1.0785 | l'T = 1.4191 |
| FNW = 3.5 | FNT = 4.5 | 2W(W) = 52° | 2W(T) = 33° |

Figure 7:
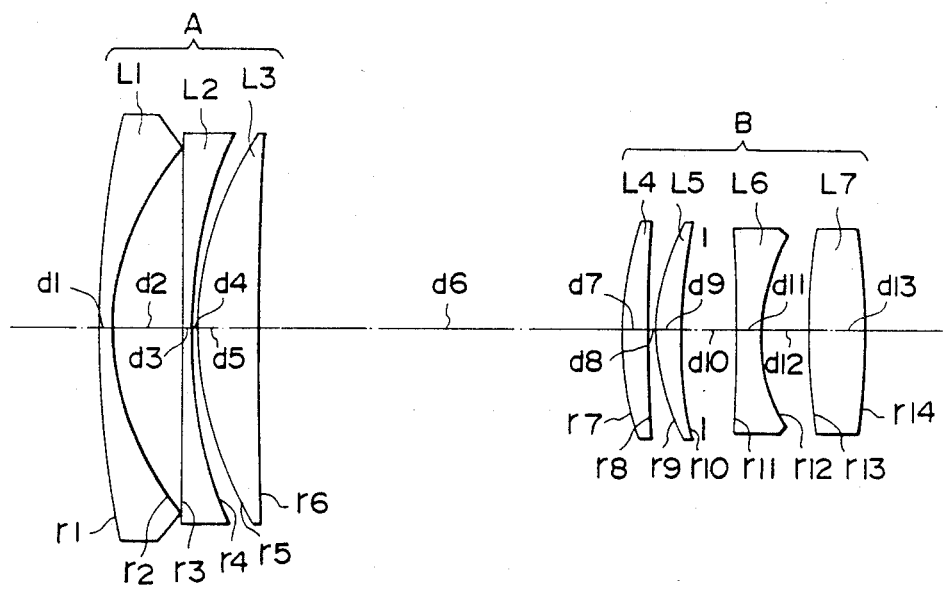
Figure 8:
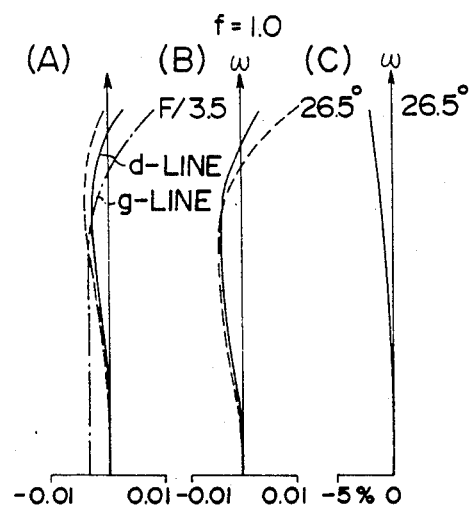
Figure 9:
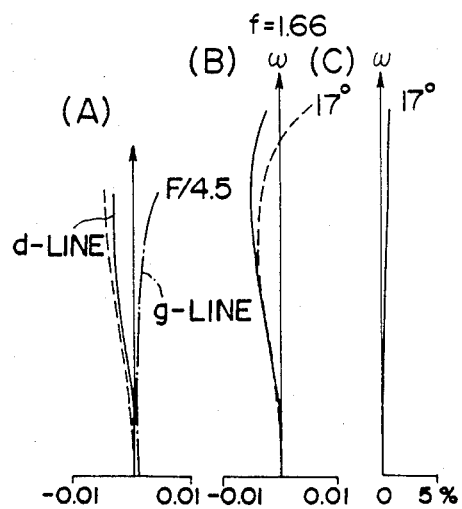

A third embodiment of this invention is shown in FIG. 7 and the correction of aberrations thereof is shown in FIGS. 8A to 8C and 9A to 9C. The specific dimensions and characteristics thereof are shown in Table III.

TABLE III

| | | | |
|---|---|---|---|
| r1 = 2.15763 | | | |
| | d1 = 0.0374 | N1 = 1.68893 | ν1 = 31.1 |
| r2 = 0.60114 | | | |
| | d2 = 0.1591 | | |
| r3 = 44.8368 | | | |
| | d3 = 0.0281 | N2 = 1.62041 | ν2 = 60.3 |
| r4 = 1.1906 | | | |
| | d4 = 0.0047 | | |
| r5 = 0.78579 | | | |
| | d5 = 0.1404 | N3 = 1.69895 | ν3 = 30.1 |
| r6 = 9.49502 | | | |
| | d6 = 0.0234 | | |
| r7 = 0.65685 | | | |
| | d7 = 0.0702 | N4 = 1.6935 | ν4 = 53.4 |
| r8 = 21.5609 | | | |
| | d8 = 0.0047 | | |
| r9 = 0.52625 | | | |
| | d9 = 0.0655 | N5 = 1.6779 | ν5 = 55.5 |
| r10 = 0.96597 | | | |
| | d10 = 0.1296 | | |
| r11 = −4.79524 | | | |
| | d11 = 0.04679 | N6 = 1.80518 | ν6 = 25.5 |
| r12 = 0.41378 | | | |
| | d12 = 0.1123 | | |
| r13 = 1.48136 | | | |
| | d13 = 0.131 | N7 = 1.61293 | ν7 = 37.0 |
| r14 = −0.99788 | | | |
| f'W = 1.0 | f'T = 1.6618 | l'W = 1.0921 | l'T = 1.4318 |
| FNW = 3.5 | FNT = 4.5 | 2W(W) = 53° | 2W(T) = 34° |

Figure 10:
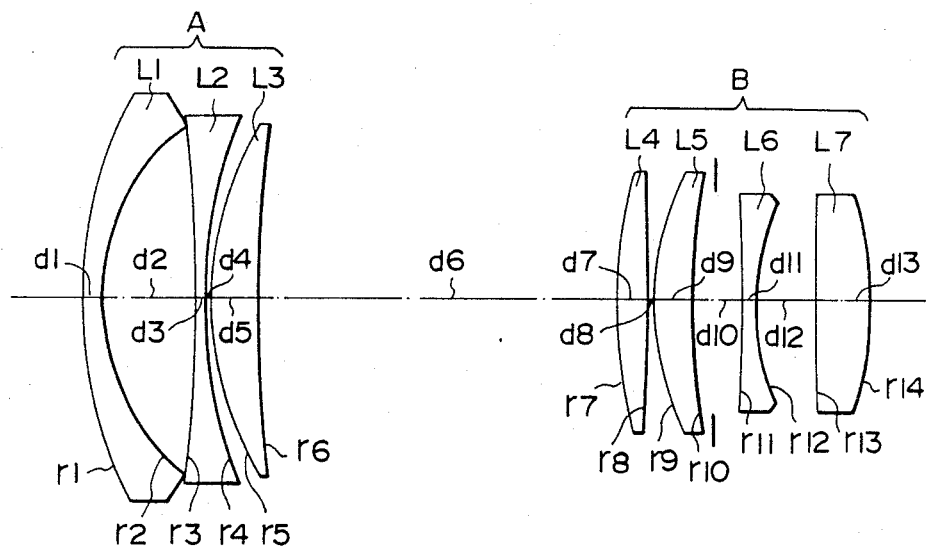
Figure 11:
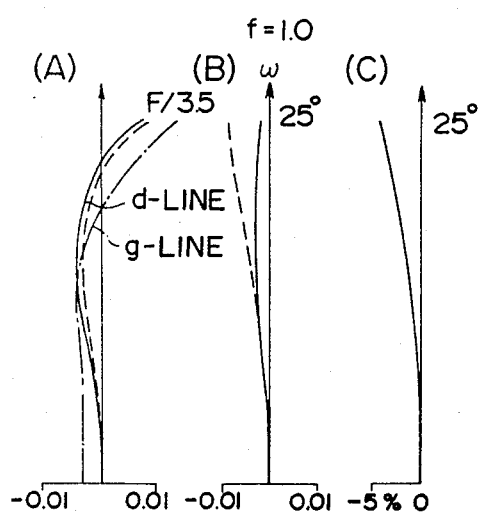
Figure 12:
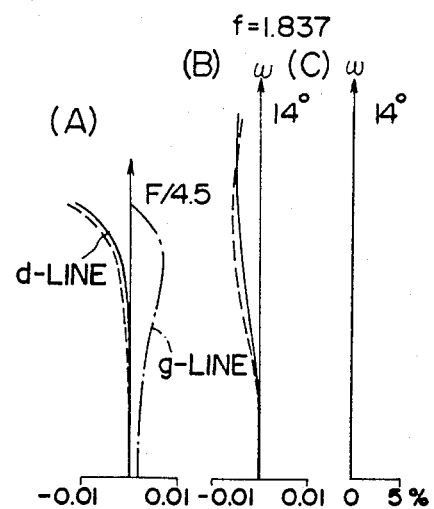

A fourth embodiment of this invention is shown in FIG. 10 and the correction of aberrations thereof is shown in FIGS. 11A to 11C and 12A to 12C. The specific dimensions and characteristics thereof are shown in Table IV.

TABLE IV

| | | | |
|---|---|---|---|
| r1 = 0.9525 | | | |
| | d1 = 0.0348 | N1 = 1.62374 | ν1 = 47.0 |
| r2 = 0.464 | | | |
| | d2 = 0.1993 | | |
| r3 = −3.0373 | | | |
| | d3 = 0.0261 | N2 = 1.62041 | ν2 = 60.3 |
| r4 = 1.05166 | | | |
| | d4 = 0.0043 | | |
| r5 = 0.71438 | | | |
| | d5 = 0.1042 | N3 = 1.7452 | ν3 = 38.3 |

TABLE IV-continued

| | | | |
|---|---|---|---|
| r6 = 3.7443 | | | |
| | d6 = 0.8247 ~ 0.0226 | | |
| r7 = 0.79824 | | | |
| | d7 = 0.0695 | N4 = 1.6779 | ν4 = 55.5 |
| r8 = −6.2048 | | | |
| | d8 = 0.0043 | | |
| r9 = 0.57913 | | | |
| | d9 = 0.0869 | N5 = 1.6779 | ν5 = 55.5 |
| r10 = 1.78741 | | | |
| | d10 = 0.1042 | | |
| r11 = −2.64838 | | | |
| | d11 = 0.0261 | N6 = 1.74077 | ν6 = 27.7 |
| r12 = 0.49925 | | | |
| | d12 = 0.1303 | | |
| r13 = 7.00545 | | | |
| | d13 = 0.1216 | N7 = 1.6393 | ν7 = 45.0 |
| r14 = −0.78971 | | | |
| f'w = 1.0 | f'T = 1.8472 | l'w = 1.2852 | l'T = 1.8366 |
| FNw = 3.5 | FNT = 4.5 | 2W(W) = 50.5° | 2W(T) = 28.5° |

Figure 13:
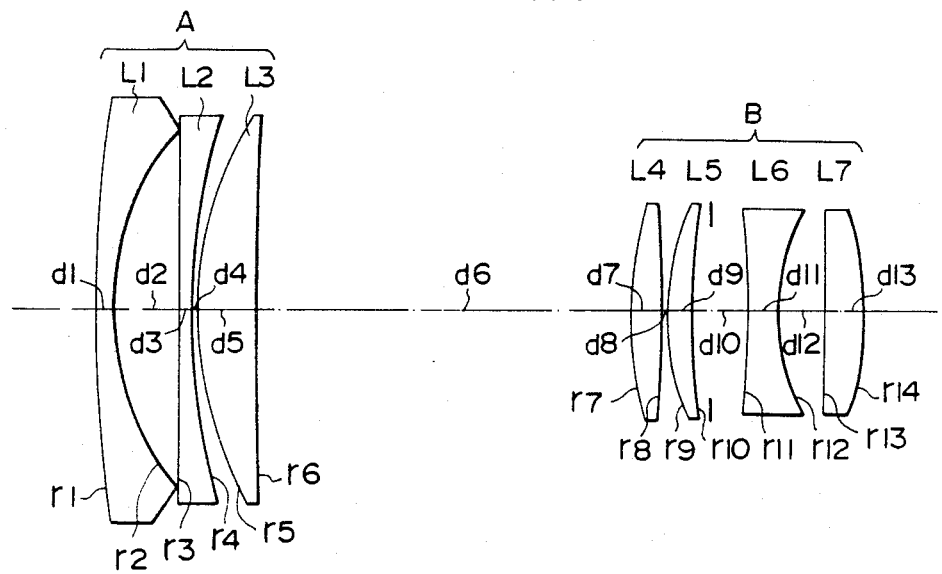
Figure 14:
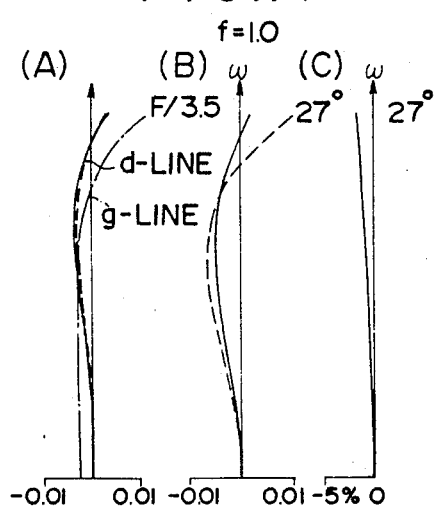
Figure 15:
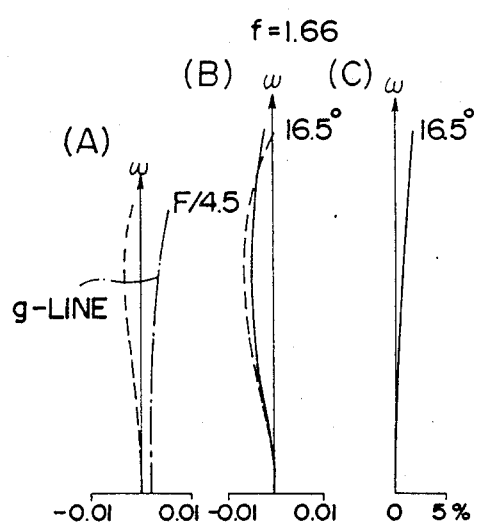

A fifth embodiment of this invention is shown in FIG. 13 and the correction of aberrations thereof is shown in FIGS. 14A to 14C and 15A to 15C. The specific dimensions and characteristics thereof are shown in Table V.

TABLE V

| | | | |
|---|---|---|---|
| r1 = 3.38718 | | | |
| | d1 = 0.0375 | N1 = 1.76182 | ν1 = 26.5 |
| r2 = 0.63783 | | | |
| | d2 = 0.1464 | | |
| r3 = 29.2632 | | | |
| | d3 = 0.0375 | N2 = 1.62041 | ν2 = 60.3 |
| r4 = 1.39693 | | | |
| | d4 = 0.0047 | | |
| r5 = 0.86101 | | | |
| | d5 = 0.1406 | N3 = 1.80518 | ν3 = 25.5 |
| r6 = 8.80946 | | | |
| | d6 = 0.9553 ~ 0.02335 | | |
| r7 = 0.86959 | | | |
| | d7 = 0.0703 | N4 = 1.6935 | ν4 = 53.4 |
| r8 = −7.93387 | | | |
| | d8 = 0.0047 | | |
| r9 = 0.58749 | | | |
| | d9 = 0.0656 | N5 = 1.6935 | ν5 = 53.4 |
| r10 = 1.81402 | | | |
| | d10 = 0.1326 | | |
| r11 = −2.42907 | | | |
| | d11 = 0.0656 | N6 = 1.80518 | ν6 = 25.5 |
| r12 = 0.47918 | | | |
| | d12 = 0.1125 | | |
| r13 = −182.0764 | | | |
| | d13 = 0.0894 | N7 = 1.59551 | ν7 = 39.2 |
| r14 = −0.68097 | | | |
| f'w = 1.0 | f'T = 1.664 | l'w = 1.1154 | l'T = 1.4635 |
| FNw = 3.5 | FNT = 4.5 | 2W(W) = 54° | 2W(T) = 33° |

In accordance with the present invention as described in detail hereinabove, a compact zoom lens can be obtained. For instance, when the first embodiment is applied to a camera for taking pictures on a film having a size of 24×36 mm, can be obtained a zoom lens system whose focal length is variable from 44.3 to 73.8 mm and the length from the front face of the first lens to the focal plane when the focal length is the longest is as short as 93.7 mm.

We claim:

1. A zoom lens system having an optical axis comprising a front lens group comprising a negative meniscus lens L1 at the front convex to front and a positive lens L3 having the face of greater curvature faced to front, and a rear lens group comprising a positive lens L4 having the face of greater curvature faced to front, a positive meniscus lens L5 convex to front, a negative lens L6 having the face of greater curvature faced to rear and a positive lens L7, the front and rear lens groups being moved in the opposite directions along said optical axis to vary the focal length of the lens system, wherein the zoom lens system satisfies the following conditions where the focal length of the front lens group is fA, the radius of curvature of the concave face of the negative meniscus lens L1 is r2, the radius of curvature of the front face of the positive lens L3 is r5, the radius of curvature of the convex face of the positive meniscus lens L5 is r9, the radius of curvature of the rear face of the negative lens L6 is r12 and the Abbe dispersion number of the positive lens L3 is ν3;

$-2.3 < fA < -1.5$,
$0.45 < r2 < 0.65$,
$0.5 < r5 < 1.0$,
$0.4 < r9 < 0.6$,
$0.3 < r12 < 0.55$, and
$ν3 < 40$, said values being normalized to a wide-angle focal length of one (f'w=1.0).

2. A zoom lens system as defined in claim 1 wherein the following conditions are satisfied

| | | | |
|---|---|---|---|
| r1 = 1.23815 | | | |
| | d1 = 0.036 | N1 = 1.744 | ν1 = 44.9 |
| r2 = 0.52874 | | | |
| | d2 = 0.1711 | | |
| r5 = 0.53579 | | | |
| | d5 = 0.099 | N3 = 1.80518 | ν3 = 25.5 |
| r6 = 0.62689 | | | |
| | d6 = 0.8367 ~ 0.0225 | | |
| r7 = 0.59616 | | | |
| | d7 = 0.0675 | N4 = 1.6968 | ν4 = 55.6 |
| r8 = 3.76112 | | | |
| | d8 = 0.0045 | | |
| r9 = 0.4317 | | | |
| | d9 = 0.063 | N5 = 1.6779 | ν5 = 55.5 |
| r10 = 1.6554 | | | |
| | d10 = 0.0779 | | |
| r11 = −28.69185 | | | |
| | d11 = 0.027 | N6 = 1.80518 | ν6 = 25.5 |
| r12 = 0.33789 | | | |
| | d12 = 0.108 | | |
| r13 = 2.99972 | | | |
| | d13 = 0.1162 | N7 = 1.76182 | ν7 = 26.5 |
| r14 = −1.2919 | | | | where the radii of curvature of the refracting surfaces, the axial air separations or thicknesses of lenses, the refractive indices for the sodium d-line and the Abbe dispersion numbers of the lenses L1 and L3 to L7 are designated in order from front to rear at r1, r2, r3 to r14, d1, d2, d5 to d13, N1, N3 to N7 and 1, ν3 to ν7.

3. A zoom lens system as defined in claim 1 wherein said front lens group further comprises a negative lens L2 located between said negative meniscus lens L1 and said positive lens L3.

4. A zoom lens system as defined in claim 3 wherein the following conditions are satisfied

| | | | |
|---|---|---|---|
| r1 = 2.8088 | | | |
| | d1 = 0.0365 | N1 = 1.68893 | $\nu$1 = 31.1 |
| r2 = 0.58955 | | | |
| | d2 = 0.1415 | | |
| r3 = 12.6753 | | | |
| | d3 = 0.0274 | N2 = 1.62299 | $\nu$2 = 58.1 |
| r4 = 1.00509 | | | |
| | d4 = 0.0046 | | |
| r5 = 0.73126 | | | |
| | d5 = 0.146 | N3 = 1.68893 | $\nu$4 = 31.1 |
| r6 = −76.0507 | | | |
| | d6 = 0.92311 ~ 0.02373 | | |
| r7 = 0.64269 | | | |
| | d7 = 0.0685 | N4 = 1.6968 | $\nu$4 = 55.6 |
| r8 = 5.24504 | | | |
| | d8 = 0.0046 | | |
| r9 = 0.47139 | | | |
| | d9 = 0.0639 | N5 = 1.6779 | $\nu$5 = 55.5 |
| r10 = 0.98131 | | | |
| | d10 = 0.1264 | | |
| r11 = 11.4077 | | | |
| | d11 = 0.0274 | N6 = 1.80518 | $\nu$6 = 25.5 |
| r12 = 0.36622 | | | |
| | d12 = 0.1052 | | |
| r13 = 1.43044 | | | |
| | d13 = 0.12 | N7 = 1.6668 | $\nu$7 = 33.1 |
| r14 = −1.43044 | | | | where r, d, N and $\nu$, respectively, designate the radii of curvature of the refracting surfaces, the axial air separations or thickness of lenses, the refractive indices for the sodium d-line and the Abbe dispersion numbers numbered by subscripts in order from front to rear.

5. A zoom lens system as defined in claim 3 wherein the following conditions are satisfied

| | | | |
|---|---|---|---|
| r1 = 2.15763 | | | |
| | d1 = 0.0374 | N1 = 1.68893 | $\nu$1 = 31.1 |
| r2 = 0.60114 | | | |
| | d2 = 0.1591 | | |
| r3 = 44.8368 | | | |
| | d3 = 0.0281 | N2 = 1.62041 | $\nu$2 = 60.3 |
| r4 = 1.1906 | | | |
| | d4 = 0.0047 | | |
| r5 = 0.78579 | | | |
| | d5 = 0.1404 | N3 = 1.69895 | $\nu$3 = 30.1 |
| r6 = 9.49502 | | | |
| | d6 = 0.9693 ~ 0.0234 | | |
| r7 = 0.65685 | | | |
| | d7 = 0.0702 | N4 = 1.6935 | $\nu$4 = 53.4 |
| r8 = 21.5609 | | | |
| | d8 = 0.0047 | | |
| r9 = 0.52625 | | | |
| | d9 = 0.0655 | N5 = 1.6779 | $\nu$5 = 55.5 |
| r10 = 0.96597 | | | |
| | d10 = 0.1296 | | |
| r11 = −4.79524 | | | |
| | d11 = 0.04679 | N6 = 1.80518 | $\nu$6 = 25.5 |
| r12 = 0.41378 | | | |
| | d12 = 0.1123 | | |
| r13 = 1.48136 | | | |
| | d13 = 0.131 | N7 = 1.61293 | $\nu$7 = 37.0 |
| r14 = −0.99788 | | | | where r, d, N and $\nu$, respectively, designate the radii of curvature of the refracting surfaces, the axial air separations or thickness of lenses, the refractive indices for the sodium d-line and the Abbe dispersion numbers numbered by subscripts in order from front to rear.

6. A zoom lens system as defined in claim 3 wherein the following conditions are satisfied

| | | | |
|---|---|---|---|
| r1 = 0.9525 | | | |
| | d1 = 0.0348 | N1 = 1.62374 | $\nu$1 = 47.0 |
| r2 = 0.464 | | | |
| | d2 = 0.1993 | | |
| r3 = −3.0373 | | | |
| | d3 = 0.0261 | N2 = 1.62041 | $\nu$2 = 60.3 |
| r4 = 1.05166 | | | |
| | d4 = 0.0043 | | |
| r5 = 0.71438 | | | |
| | d5 = 0.1042 | N3 = 1.7452 | $\nu$3 = 38.3 |
| r6 = 3.7443 | | | |
| | d6 = 0.8247 ~ 0.0226 | | |
| r7 = 0.97824 | | | |
| | d7 = 0.0695 | N4 = 1.6779 | $\nu$4 = 55.5 |
| r8 = −6.2048 | | | |
| | d8 = 0.0043 | | |
| r9 = 0.57913 | | | |
| | d9 = 0.0869 | N5 = 1.6779 | $\nu$5 = 55.5 |
| r10 = 1.78711 | | | |
| | d10 = 0.1042 | | |
| r11 = −2.64838 | | | |
| | d11 = 0.0261 | N6 = 1.74077 | $\nu$6 = 27.7 |
| r12 = 0.49925 | | | |
| | d12 = 0.1303 | | |
| r13 = 7.00545 | | | |
| | d13 = 0.1216 | N7 = 1.6393 | $\nu$7 = 45.0 |
| r14 = −0.78971 | | | | where r, d, N and $\nu$, respectively, designate the radii of curvature of the refracting surfaces, the axial air separations or thickness of lenses, the refractive indices for the sodium d-line and the Abbe dispersion numbers numbered by subscripts in order from front to rear.

7. A zoom lens system as defined in claim 3 wherein the following conditions are satisfied

| | | | |
|---|---|---|---|
| r1 = 3.38718 | | | |
| | d1 = 0.0375 | N1 = 1.76182 | $\nu$1 = 26.5 |
| r2 = 0.63783 | | | |
| | d2 = 0.1464 | | |
| r3 = 29.2632 | | | |
| | d3 = 0.0375 | N2 = 1.62041 | $\nu$2 = 60.3 |
| r4 = 1.39693 | | | |
| | d4 = 0.0047 | | |
| r5 = 0.86101 | | | |
| | d5 = 0.1406 | N3 = 1.80518 | $\nu$3 = 25.5 |
| r6 = 8.80946 | | | |
| | d6 = 0.9553 ~ 0.02335 | | |
| r7 = 0.86959 | | | |
| | d7 = 0.0703 | N4 = 1.6935 | $\nu$4 = 53.4 |
| r8 = −7.93387 | | | |
| | d8 = 0.0047 | | |
| r9 = 0.58749 | | | |
| | d9 = 0.0656 | N5 = 1.6935 | $\nu$5 = 53.4 |
| r10 = 1.81402 | | | |
| | d10 = 0.1326 | | |
| r11 = −2.42907 | | | |
| | d11 = 0.0656 | N6 = 1.80518 | $\nu$6 = 25.5 |
| r12 = 0.47918 | | | |
| | d12 = 0.1125 | | |
| r13 = −182.0764 | | | |
| | d13 = 0.0894 | N7 = 1.59551 | $\nu$7 = 39.2 |
| r14 = −0.68097 | | | | where r, d, N and $\nu$, respectively, designate the radii of curvature of the refracting surfaces, the axial air separations or thickness of lenses, the refractive indices for the sodium d-line and the Abbe dispersion numbers numbered by subscripts in order from front to rear.

* * * * *